(12) United States Patent
Shuert

(10) Patent No.: US 11,365,542 B2
(45) Date of Patent: Jun. 21, 2022

(54) PLASTIC CORE STRUCTURE MANUFACTURED THROUGH TWIN SHEET TECHNOLOGY

(71) Applicant: Shuert Technology, LLC, Sterling Heights, MI (US)

(72) Inventor: Lyle H. Shuert, Birmingham, MI (US)

(73) Assignee: Shuert Technology, LLC, Sterling Heights, MI (US)

( * ) Notice: Subject to any disclaimer, the term of this patent is extended or adjusted under 35 U.S.C. 154(b) by 124 days.

(21) Appl. No.: 16/244,526

(22) Filed: Jan. 10, 2019

(65) Prior Publication Data

US 2019/0211556 A1 Jul. 11, 2019

Related U.S. Application Data

(60) Provisional application No. 62/615,494, filed on Jan. 10, 2018.

(51) Int. Cl.
*E04C 2/20* (2006.01)
*E04C 2/32* (2006.01)
(Continued)

(52) U.S. Cl.
CPC .......... *E04C 2/20* (2013.01); *E04C 2/24* (2013.01); *E04C 2/326* (2013.01); *B29C 51/082* (2013.01); *B29K 2023/065* (2013.01); *B29K 2105/04* (2013.01); *B29K 2105/256* (2013.01); *B29L 2031/10* (2013.01); *B32B 3/12* (2013.01); *B32B 3/30* (2013.01); *B32B 7/05* (2019.01); *B32B 7/12* (2013.01); *B32B 15/08* (2013.01); *B32B 27/08* (2013.01); *B32B 27/32* (2013.01); *B32B 2250/242* (2013.01); *B32B 2307/306* (2013.01); *B32B 2307/546* (2013.01); *B32B 2307/558* (2013.01); *B32B 2419/04* (2013.01); *B32B 2439/00* (2013.01); *B32B 2605/00* (2013.01);
(Continued)

(58) Field of Classification Search
None
See application file for complete search history.

(56) References Cited

U.S. PATENT DOCUMENTS 2,973,931 A 3/1961 Brown
4,495,237 A * 1/1985 Patterson ................. B32B 3/28
428/178

(Continued)

FOREIGN PATENT DOCUMENTS

EP 1223258 A2 * 7/2002 ............ E04C 2/326
EP 1251216 A2 * 10/2002 ............ E04C 2/326
(Continued)

OTHER PUBLICATIONS

Uema et al., machine translation JP 2011-110847 Abstract and Description, Jun. 9, 2011 (Year: 2011).*
(Continued)

*Primary Examiner* — Mary I Omori
(74) *Attorney, Agent, or Firm* — Young Basile Hanlon & MacFarlane, P.C.

(57) ABSTRACT

A twin sheet core structure made up of two sheets of plastic that have been thermoformed to define arrays of cavities having floors opening to surfaces defined by orthogonally intersecting ribs wherein the sheets are fused together to form a single structure with hollow areas between sheets.

2 Claims, 8 Drawing Sheets

(51) Int. Cl.

| | | |
|---|---|---|
| *E04C 2/24* | (2006.01) | |
| *B32B 3/30* | (2006.01) | |
| *B32B 3/12* | (2006.01) | |
| *B32B 15/08* | (2006.01) | |
| *B32B 27/08* | (2006.01) | |
| *B32B 27/32* | (2006.01) | |
| *B32B 7/05* | (2019.01) | |
| *B32B 7/12* | (2006.01) | |
| *B29C 51/08* | (2006.01) | |
| *B29K 23/00* | (2006.01) | |
| *B29K 105/04* | (2006.01) | |
| *B29K 105/00* | (2006.01) | |
| *B29L 31/10* | (2006.01) | |
| *E04C 2/34* | (2006.01) | |

(52) U.S. Cl.
CPC ... *B32B 2607/00* (2013.01); *E04C 2002/3422* (2013.01); *E04C 2002/3433* (2013.01)

(56) References Cited

U.S. PATENT DOCUMENTS

| | | |
|---|---|---|
| 5,390,467 A | 2/1995 | Shuert |
| 5,894,045 A * | 4/1999 | Desrondiers ............. B32B 3/12 428/178 |
| 6,200,664 B1 | 3/2001 | Figge et al. |
| 8,091,314 B2 | 1/2012 | Polk, Jr. et al. |
| 10,160,180 B2 | 12/2018 | Shuert et al. |
| 2001/0012812 A1* | 8/2001 | Spengler ............... E04C 2/3405 493/100 |
| 2003/0019403 A1* | 1/2003 | Gruber ................... B65D 71/70 108/53.1 |
| 2005/0200062 A1* | 9/2005 | Maurer ..................... F16F 7/08 267/144 |
| 2006/0177635 A1* | 8/2006 | Pepe ........................ B32B 3/12 428/174 |
| 2006/0254946 A1* | 11/2006 | Becklin .............. B65D 21/0223 206/508 |
| 2012/0295065 A1* | 11/2012 | Shimizu .................. E04C 2/326 428/156 |
| 2015/0165723 A1* | 6/2015 | Shuert .................... B32B 27/08 428/118 |
| 2017/0120553 A1* | 5/2017 | Ros ......................... B32B 15/08 |

FOREIGN PATENT DOCUMENTS

| | | |
|---|---|---|
| JP | 4466343 B2 * | 5/2010 |
| JP | 2011110847 A * | 6/2011 |

OTHER PUBLICATIONS

Iwasaka et al., machine translation of JP 4466343 Abstract and Description, May 26, 2010 (Year: 2010).*
Haupt-Bohmann et al., machine translation of EP 1 251 216 , Oct. 23, 2002 (Year: 2002).*

* cited by examiner

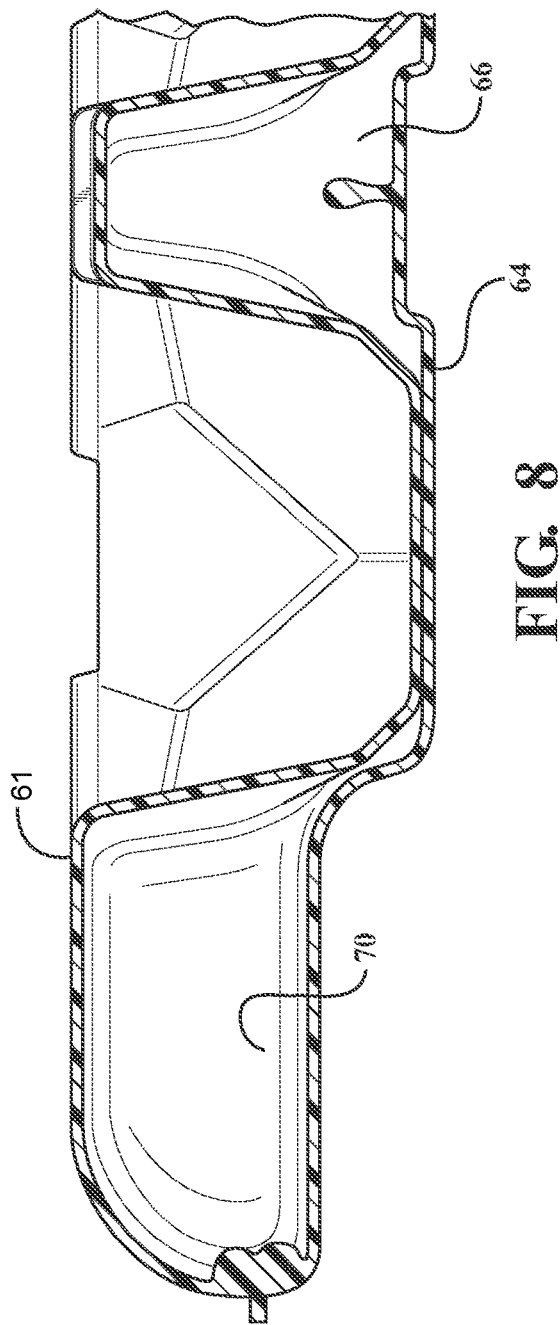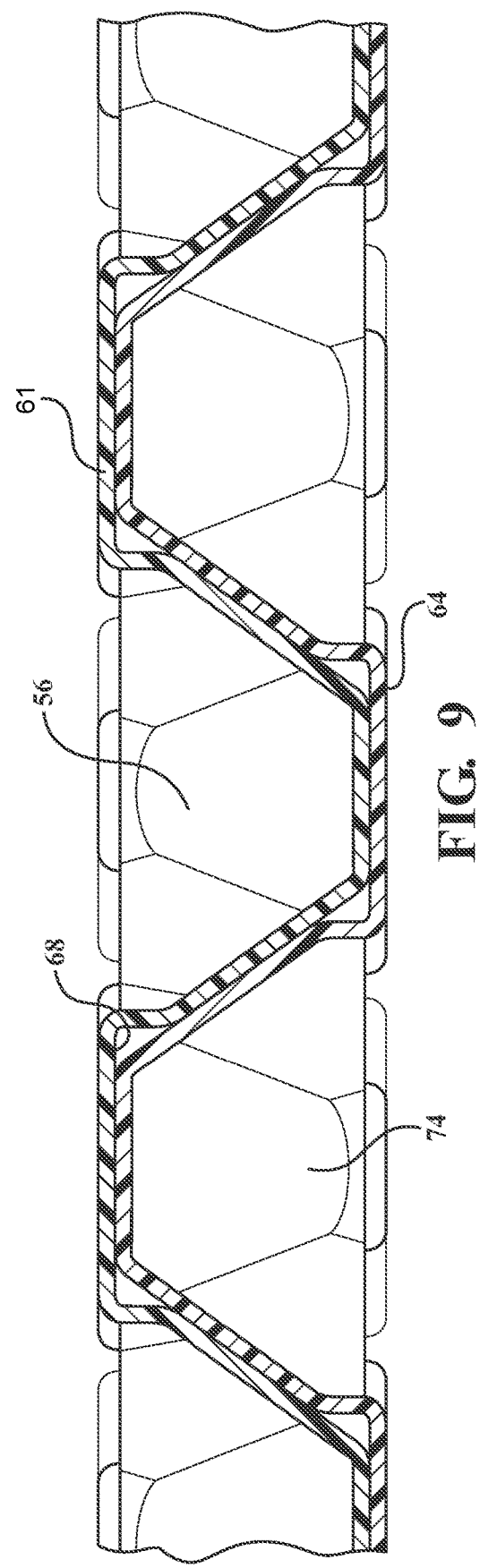

PLASTIC CORE STRUCTURE MANUFACTURED THROUGH TWIN SHEET TECHNOLOGY

CROSS-REFERENCE TO RELATED APPLICATION

This application claims the benefit of U.S. Provisional Application Ser. No. 62/615,494 filed on Jan. 10, 2018, the contents of which are incorporated herein in its entirely by reference.

TECHNICAL FIELD

This invention relates to plastic core structures and particularly to core structures manufactured using twin sheet technology.

BACKGROUND OF THE INVENTION

The term "twin sheet technology," as used herein, refers to a process in which two sheets of plastic material are thermoformed into conjugal geometries and are thereafter fused to one another while still in a semi-fluid state to create a rigid structure. An example is a 9-legged pallet. This technology involves the use of an apparatus having upper and lower molds onto which sheets of thermoformable plastic material are placed and pulled into the mold geometries by vacuum. The two molded sheets are, while still hot and semi-fluid, then strategically brought together in such a way that geometric portions formed in one sheet inter-fit with or contact geometric formations in the other sheet and fuse together in strategically designed areas.

Twin sheet technology has been used to make plastic pallets having load-bearing decks and downwardly extending legs; an example is shown in my U.S. Pat. No. 5,950,545. In that example, two sheets of plastic are separately, but simultaneously, thermoformed into different shapes and thereafter fused together to form a pallet. Both thermoformed sheets have legs in the same general orientation as that are telescoped into one another in the joining step so as to knit along the sidewalls thereof. The legs are spaced in the final product to allow for forklift entry.

As used herein the term "core structure" refers to a molded plastic cellular structure which can be used as a building component for any number of fabricated products, either load bearing or non-load bearing, including but not limited to doors, walls, floors, temporary roadways, stage platforms, sport play surfaces, furniture and other fabricated products. As a core component of such products, the subject matter disclosed herein creates strength and rigidity with relatively little weight in view of the fact that the core structure is characterized by continuous arrays of cavities or receptacles formed in sheets of plastic material in such a way that the plastic material has spaced apart obverse and reverse surfaces in the form of networks of ribs to which additional sheet materials can be bonded using any of a variety of technologies.

In contrast to the twin sheet pallet described above, the two sheets of the core structure are substantially similar in configuration after thermoforming, in that each displays an array of receptacles or cavities having sidewalls and floors formed throughout the sheets. However, unlike the sheets that make up a pallet, the receptacles in the two sheets are inverted relative to one another and the sheets are joined together such that the receptacles are offset so as to share some common sidewalls. The floors of the receptacles on one side become surface lands on the opposite side. Additional details are provided further with this specification.

In my application for U.S. patent Ser. No. 14/958,444, now U.S. Pat. No. 10,160,180, I describe a single-ply core structure characterized by arrays of cavities opening from opposite surfaces of a structure wherein the cavities are surrounded on both surfaces by continuous networks of rib structures. The cavities on the two sides are offset from one another. The preferred forming methods are compression molding and injection molding. That structure can be distinguished from typical "egg crate" structures in which there is no interconnecting structure between the bottoms or floors of the receptacles on the outsides thereof; an example is U.S. Pat. No. 2,809,908 (French).

BRIEF DISCLOSURE OF THE INVENTION

This document shows how twin sheet technology can be used to manufacture molded plastic core structures characterized by arrays of oppositely oriented receptacles or cavities in what ultimately has the physical characteristics of board stock with parallel obverse and reverse surfaces to which the receptacles open, thus, creating opposite surfaces which are spaced apart by the depth of the receptacles and which are characterized by networks of continuous rib structures that surround the cavities or receptacles opening to each side. The terms "cavities" and "receptacles" are used synonymously herein to describe recesses with sidewalls, floors, and opening to surrounding surfaces.

As the result of the use of twin sheet processing, the width of the ribs; i.e. the surfaces between the top edges of the open cavities, can be made substantially greater than in a compression or injection molded monolithic structure, thus creating more area on both of the opposite surfaces of the core structure. These wider ribs create more surface area to which structural and/or cosmetic outer sheets can be adhered to plastic core structures and particularly to core structures manufactured using twin sheet technology.

Whereas the rib structures in my previous patent are generally solid and an increase in the width of those rib structures would necessarily result in a substantial addition of plastic material with a resulting increase in cost and weight, the rib structures of the twin sheet core structure as disclosed herein are partially hollow and thus can be made wider without adding significant plastic content or weight.

Summarizing, the inventions disclosed herein include a method of fabricating a light weight cellular molded plastic core structure using twin sheet technology as well as the core structure itself and the specific geometries of the cavities or receptacles formed therein.

BRIEF DESCRIPTION OF THE DRAWINGS

FIG. 8 is a sectional view of the FIG. 5 structure along a section line;

FIG. 9 is a sectional view of the FIG. 5 structure along a section line 9-9.

DETAILED DESCRIPTION OF THE ILLUSTRATIVE EMBODIMENTS

Figure 1:
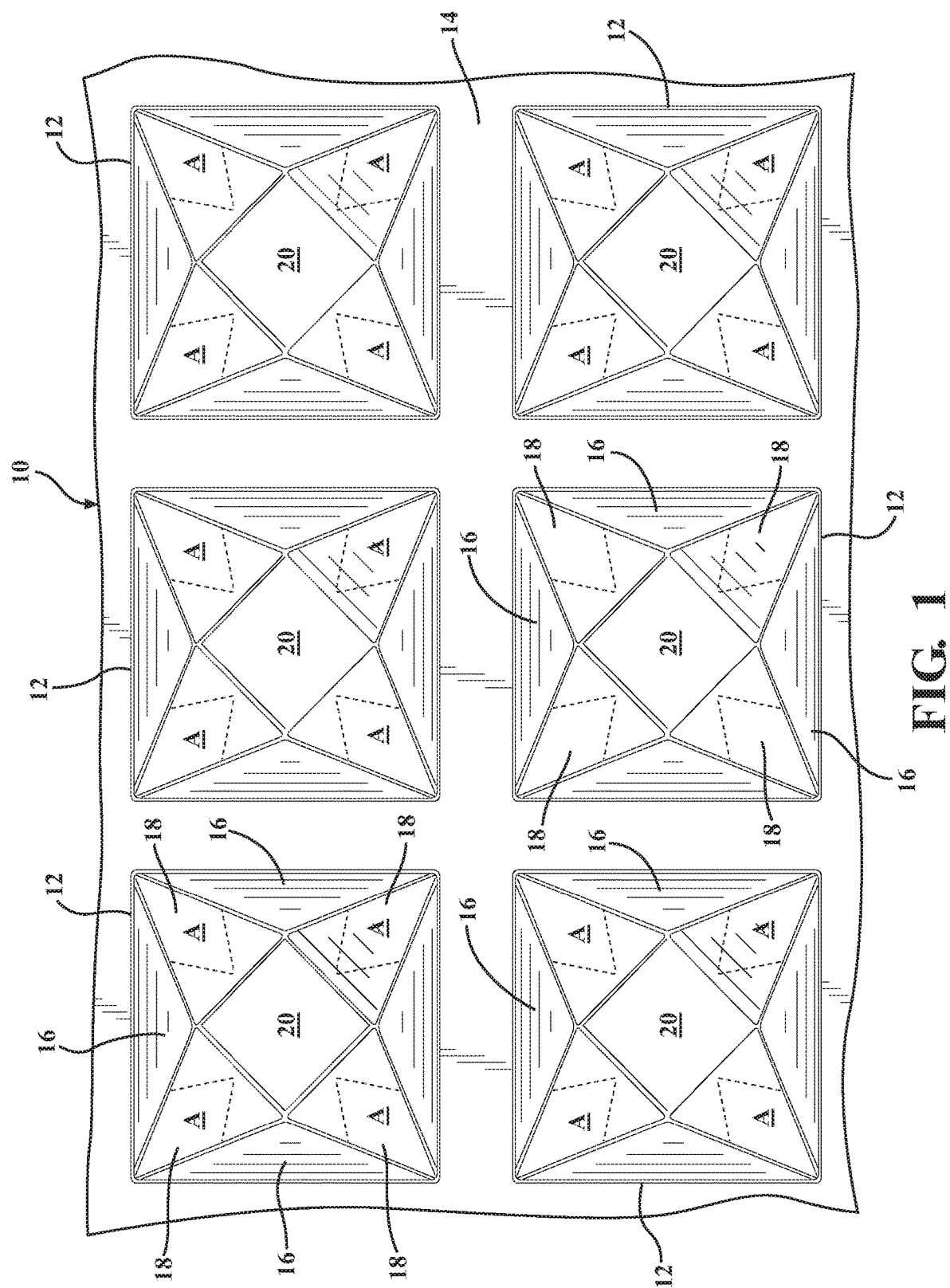
FIG. 1 is a plan view of a portion of a core structure made with twin sheet technology.
Figure 2:
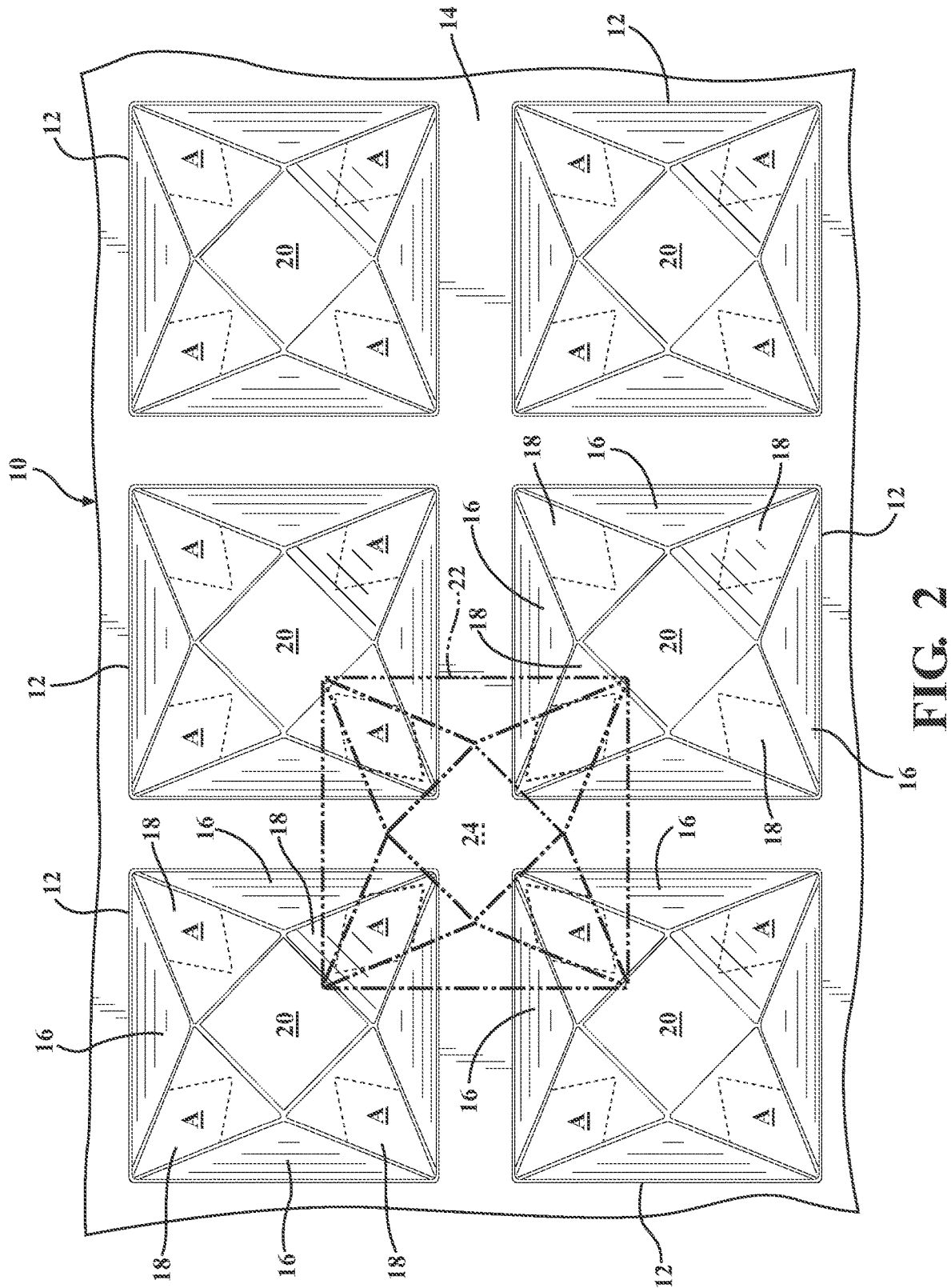
FIG. 2 is a duplicate of FIG. 1 to the extent of showing the top surface 14 of a twin sheet core structure but has added therein in phantom lines the outline of a receptacle that opens to the reverse surface.

Referring to FIGS. 1 and 2 a portion of a molded plastic core structure 10 constructed using twin sheet technology is shown to comprise an array of four-sided receptacles 12 arranged in rows and columns and of identical size and geometry. Each of the receptacles 12 is surrounded by a network of orthogonal intersecting ribs 14 which form a continuous top or "obverse" surface of the twin sheet core structure, it being understood that a similar surface area made up of intersecting ribs offset from those appearing in FIG. 1, exists on the reverse side of the core structure as will be further explained with reference to FIGS. 2 and 4. The two surfaces are separated essentially by the depth of the receptacles 12.

In the embodiments shown FIGS. 1 and 2 each receptacle or cavity 12 has walls 16 of a first triangular geometry spaced around the outside perimeter of the receptacle and extending downwardly and sloping inwardly from the obverse or front-side rib surface 14. Alternatingly interspersed between the walls 16 are polygonal, in this case triangular, walls 18 the apices start from the corners of the receptacles 12 and the surfaces of the walls 18 extend slopingly inwardly to define the outside edges of a square floor 20 on the bottom of each receptacle. That floor, as will be illustrated in, for example, in FIG. 2, is co-extensive with the intersection of the orthogonally intersecting ribs in the sheet which forms the bottom or reverse surface of the twin sheet core structure shown in FIGS. 1 and 2

All of the walls 16 and 18 slope inwardly toward the floor 20 and all of the receptacle openings are spaced apart from one another by the intersecting rib structures 14 of substantial width, both vertically and horizontally as shown in FIGS. 1 and 2. FIG. 1 shows in broken line the areas A of the sidewalls 18 where fusing between the two sheets of the twin sheet structure occurs.

Looking to FIG. 2 the structure 10 is again shown with the same geometry for the receptacles 12 but superimposed on the drawing of FIG. 2 in phantom lines is the geometry of an inverted cell or receptacle 22 on the opposite side of the core structure showing how the floor 24 of that structure corresponds generally to and is fused to the inside surface of the intersecting ribs structures 14 at the center left of FIG. 2. Only one inverted receptacle is shown but it is to be understood that an entire array of receptacles is formed on the reverse side of the core structure. FIG. 2 also shows triangular areas A of the walls 18 where to the two sheets of the twin sheet core structure are fused together. The rib structures 14, apart from the fused areas of the floors with the rib intersections, are generally hollow thus allowing for substantial separation of the receptacles 12 without adding unwanted weight and cost to the fabrication of the core structure. In my single ply core structure applications described above, the ribs structures are solid and making them wide, as shown here, would add both material and weight to the core structure Looking now to FIGS. 3 and 4 another twin sheet core structure 30 is shown having an array of receptacles 40 in both surfaces; i.e. in both of the fused sheets of the structure and, therefore, in the identical obverse and reverse sides of the structure. As in the embodiment of FIGS. 1 and 2, the receptacles 40 have eight walls including major walls 44 which are polygonal and in this case four-sided extending from the rib surface 42 to a floor 48 and forming a portion of the side of the floor structure 48. Alternatingly interspersed between the walls 44 are walls 46 which also slope inwardly toward the floor 48 and form the remaining portions of the eight sided floors. The rib structures 42 are wider and more easily formed than the rib structures 14 in the embodiment of FIGS. 1 and 2. They also create more surface area for the application of additional skins of structural and/or cosmetic material to complete a fabricated product in which the core structure is an interior component.

Figure 3:
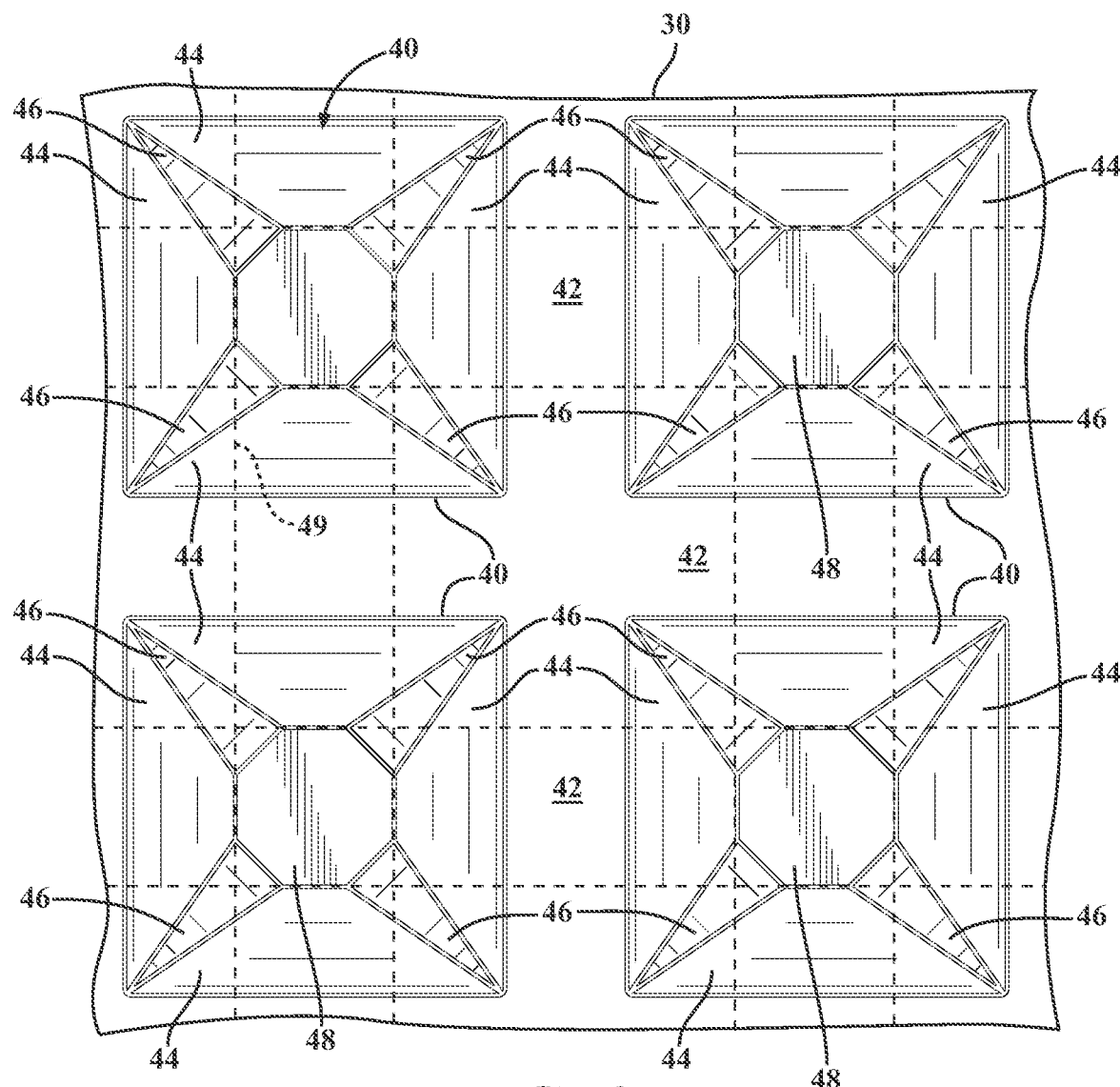
FIG. 3 is a plan view of another twin sheet core structure showing an alternative geometry for the four-sided receptacles and an increase in the width dimension of the intersecting ribs that form a network around the outside edges of the receptacles.

Superimposed on FIG. 3 in dashed lines are the boundaries of cavities or receptacles 49 formed in the opposite side; i.e. the opposite side of the twin sheet structure and it will be seen in FIG. 3 that the centers of those cavities are offset both horizontally and vertically in the view of FIG. 3 by ½ of the distance between receptacle centers on the surface shown in full plan view. As a result, the floor 48 of a receptacle on the opposite side correspond with and is fused to the intersection or crossing point of the ribs 42 on the side of the twin sheet structure which is visible in FIG. 3.

Figure 4:
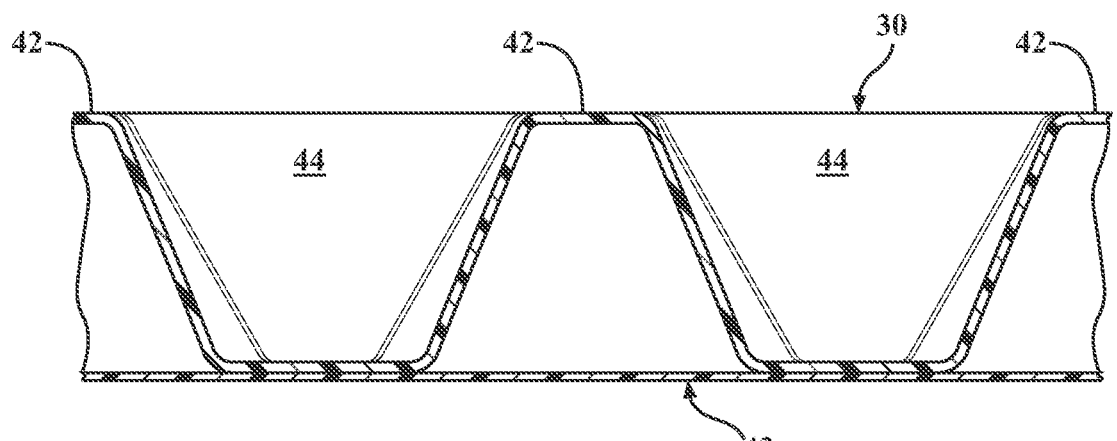
FIG. 4 is a cross section through a side surface of the structure of FIG. 3 showing the hollow area in a rib structure 42.

This is illustrated in FIG. 4 where the bottom sheet is shown at 43 and top sheet generally at 30. The ribs 42 are shown in this sectional view to be generally hollow at the portions which are spaced away from the intersections which intersections correspond to the floor 48 of the receptacles shown in FIG. 3. Thus, the majority of the rib structures are hollow giving rise to a light weight structure using minimal material while at the same time affording large areas to which structural or cosmetic skins can be bonded in the creation of a fabricated product. Although the two sheets of plastic are shown in FIG. 4 as separate, in actual practice, the fusing of the sheets is such as to create a monolithic structure in the fused areas which the original layers are no longer identifiable.

Summarizing, the structures shown in FIGS. 1-4 are created using twin sheet technology in which each of two thermoplastic material sheets are brought into a twin sheet press having top and bottom conjugal mold structures. Using vacuum, the sheets are drawn into conforming relationship with the geometry of the mold structures and, while the plastic material is still hot and semi-fluid, the mold structures are hydraulically or pneumatically powered together with strategic orientation of the geometry of one mold relative to the geometry of the other mold so that the two form sheets of material bond together in accordance with the disclosures herein as set forth above; i.e. the floors of the receptacles in one sheet enter into the spaces between receptacles in the other sheet and bond to the inside surfaces of the crossing rib structures in the opposite sheet. Thus, the two sheets are formed together with receptacles opening to both sides and with wider rib structures surrounding the receptacles wherein the rib structures are generally hollow as opposed to being solid throughout their lateral extent. The geometries of the cavities are such as to provide inwardly sloping walls of alternatingly different first and second geometries at least one of said geometries being triangular. The other of said geometries may be triangular but may be polygonal wherein the number of sides is greater than 3 as illustrated in FIG. 3.

After joining the two sheets of thermoformed material, the structure is cooled and removed from the press for further processing. As indicated above, such core structures can form the center component of many different fabricated products through the additional of structural and/or cosmetic skins of any of a variety of materials including wood, plastic and metal.

Figure 5:
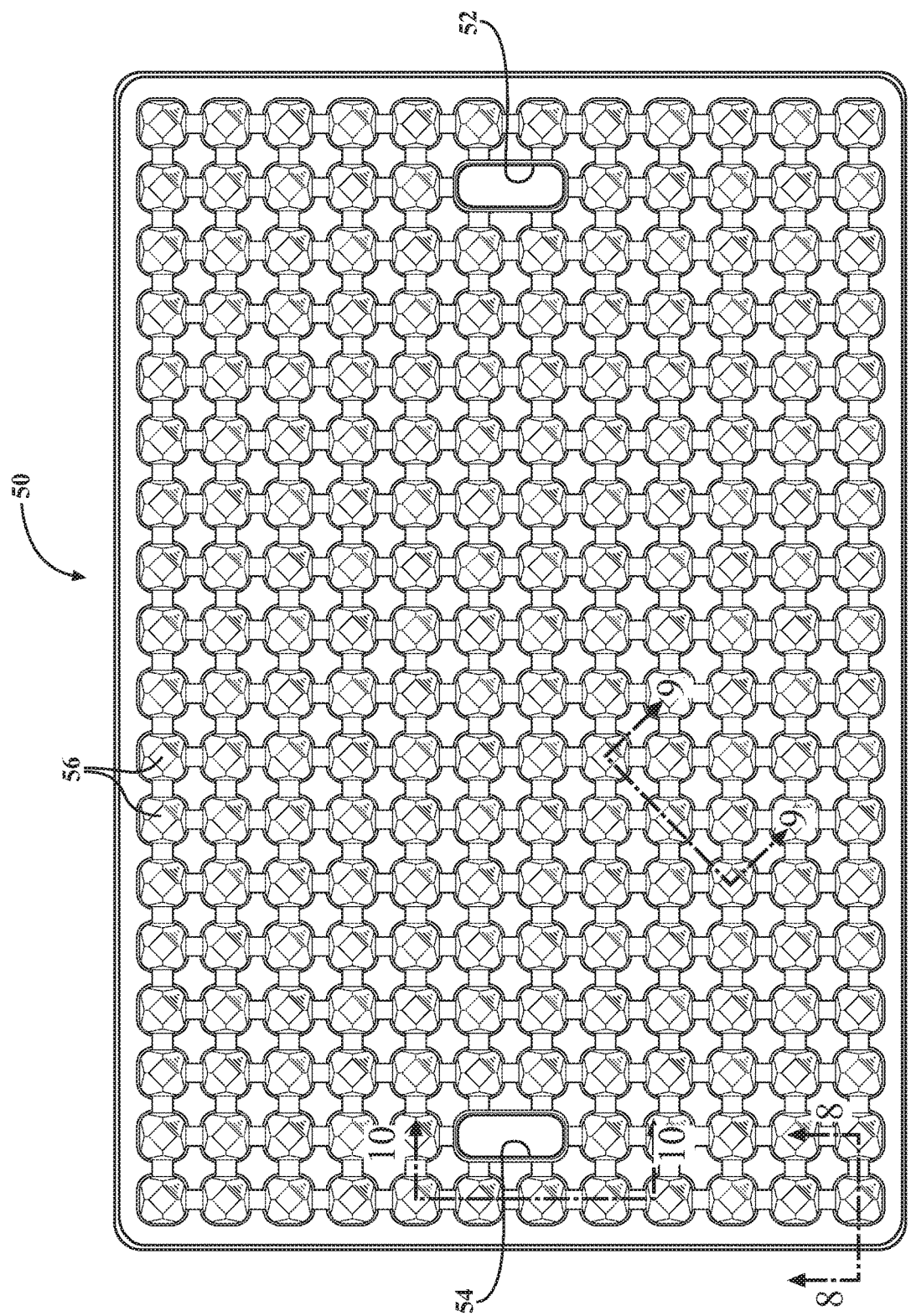
FIG. 5 is a plan view of a pallet using an illustrative core structure design.

Referring now to FIGS. 5-10, there is shown a core structure 50 shaped in the form of a 3'×4' board having optional handle slots 52 and 54. The side seen in FIG. 5 is characterized by a two-dimensional array of substantially square cavities 56 surrounded by orthogonal ribs 58 and 60 that intersect to form lands 62. The ribs 58, 60 may be formed with recesses to cooperate with identical boards stacked thereon to prevent sideways slippage between them. It is to be understood that FIG. 5, although showing only one side of the structure, also represents the geometry of the opposite (hidden) side, off-set as described above with respect to FIGS. 1-4. The structure 50 is made of two sheets 61 and 64 of thermoformed plastic material that have been fused together in the manner shown in FIGS. 6-10 to form a single, fully integral structure of high strength-to-weight ratio.

Cavities 56 in both sides have four identical inwardly sloping polygonal sidewalls 64 alternatingly interleaved with essentially triangular sidewalls 66. The sidewalls 64 are six-sided and extend fully from the lands 62 to the cavity floors 70 while the triangular walls 66 are less sloped and extend only partially from the ribs 58, 60 to meet intersecting seam lines between walls 64.

FIG. 8 shows how the sheets 61 and 64 can be fused together at the edges if desired.

Figure 10:
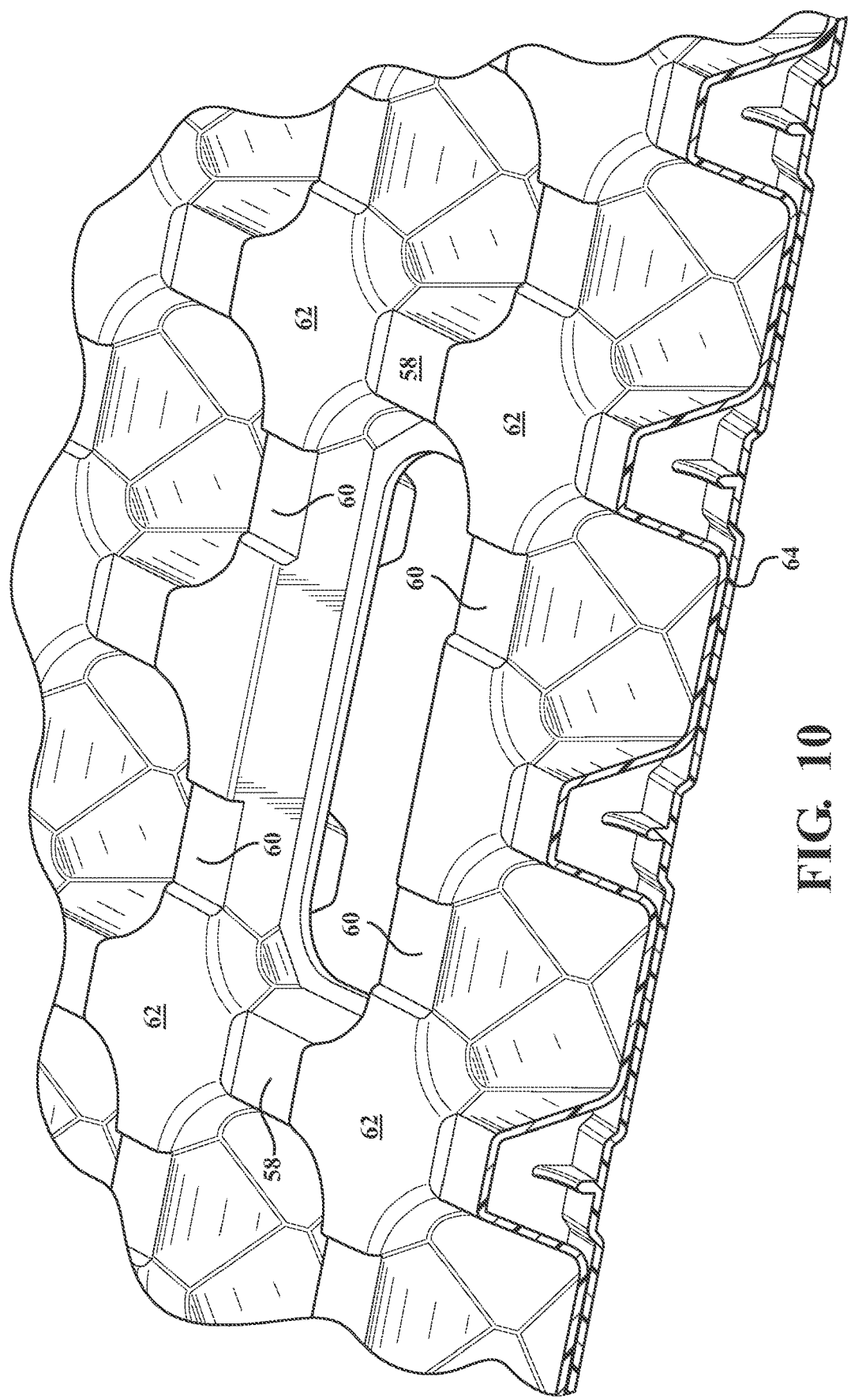
FIG. 10 is a perspective view of the FIG. 5 structure along section line 10-10.

FIGS. 9 and 10 show in section how the sheets are fused together along top and bottom ribs and also along sidewalls, yet provide hollow spaces 66 and 68 between the sheets, which hollows substantially reduce the weight of the structure while retaining load strength and rigidity.

FIG. 9, for example, shows how the cavities 56 and 74 in opposite sides of the board structure are nested with one another, while being offset.

Figure 6:
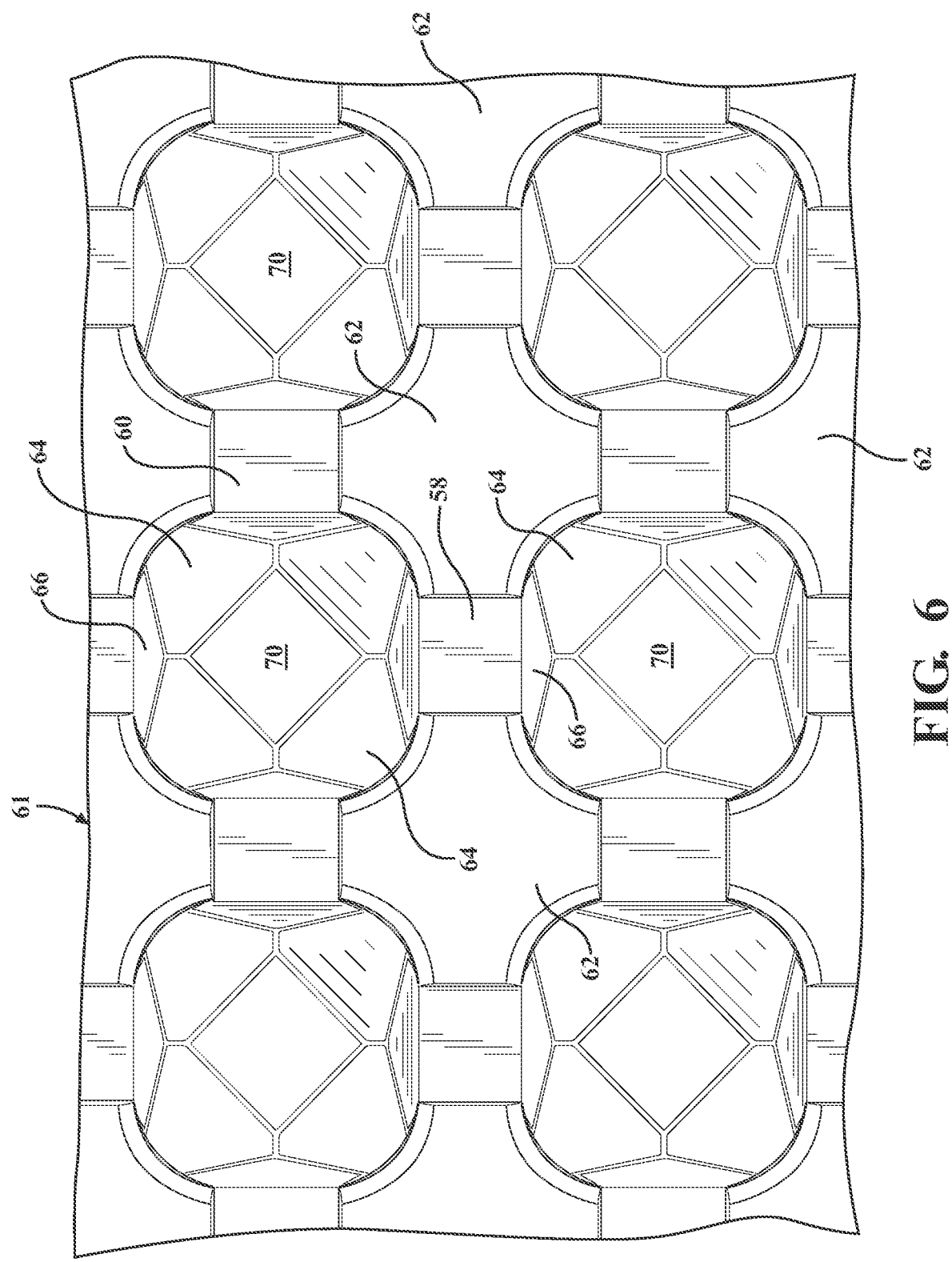
FIG. 6 is a partial plan view of the structure of FIG. 5, enlarged to show details of cavity sidewalls and rib structures.
Figure 7:
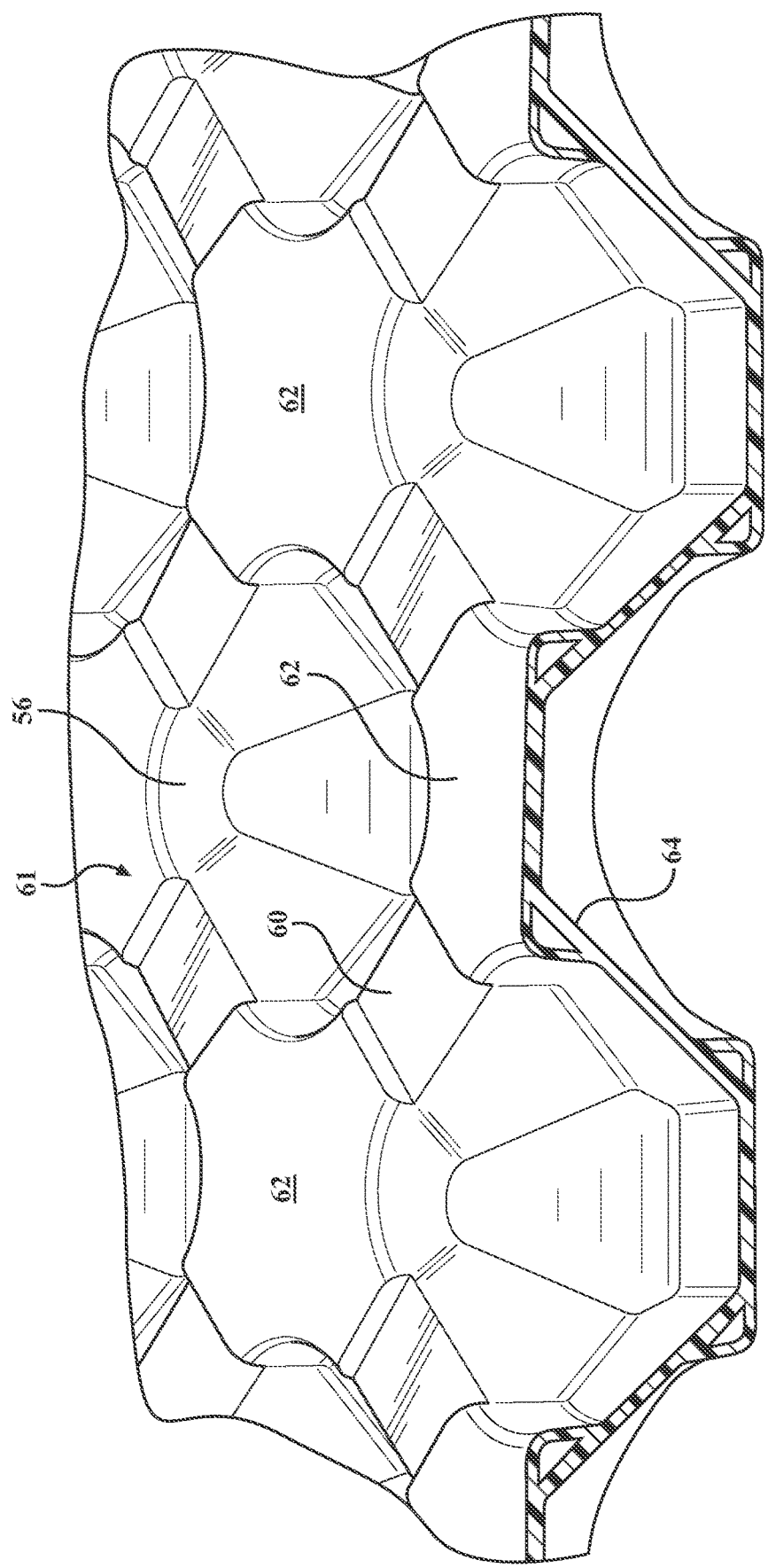
FIG. 7 is a perspective and sectional view of a portion of FIG. 5.

While the sheets are shown with parting lines in the figures, it will be understood by those persons familiar with twin-sheet thermoforming that the sheets are fused into a solid structure along the parting lines between sidewalls and ribs/lands. It will also be apparent from the foregoing that the sidewall configurations of the receptacles can vary, albeit all embodiments have sidewalls of at least two different polygonal shape. In the embodiment of FIG. 1, all sidewalls are triangular and all extend the full depth of a receptacle. In FIG. 3, sidewalls 46 are triangular while the intervening walls 44 are four-sided. All extend the full depth of the receptacles. In FIG. 6, sidewalls 66 are triangular, do not extend full depth, and sidewalls 64 are six-sided and extend full depth. These geometric differences notwithstanding, all receptacles on one side share some sidewalls with adjoining but inverted receptacles on the opposite side and all are surrounded by orthogonal rib structures on each side. The result in each case is a core structure made by fusing two thermoformed sheets of essentially identical geometry in inverted, inter-nesting fashion to create a board-stock suitable for any of many different purposes. Additional "skins" can be readily added to either or both surfaces to close the receptacles as desired and multiple structures can be jointed in stacked fashion for added strength.

It is to be understood that the invention has been illustrated and described with respect to an illustrative embodiment and the various modifications and changes to the invention may be made without departing from the spirit and scope of the invention as defined by the claims.

What is claimed is:

1. A twin sheet molded plastic core structure comprising:
first and second identical molded plastic sheets each having a two-dimensional array of open receptacles formed therein on both sides of each of the first and second identical molded plastic sheets, wherein the open receptacles have sidewalls sloping inwardly to planar floors having inner and outer surfaces, wherein openings in the array of open receptacles on both sides of the twin sheet molded plastic core structure are surroundingly bordered by orthogonal sets of ribs forming cruciform lands with inner and outer surfaces, the inner surfaces of the cruciform lands having a larger dimension than the outer surfaces of the planar floors in each of the first and second identical molded plastic sheets;
said first and second identical molded plastic sheets being joined in a mutually inverted relationship by nesting the sidewalls to adjacent open receptacles and fusing the outer surfaces of the smaller dimension planar floors to the larger dimension inner surfaces of the cruciform lands so as to create peripheral hollows between each fused planar floor and cruciform land combination.

2. The twin sheet molded plastic core structure defined in claim 1, wherein the outer surfaces of the orthogonal set of ribs are partially recessed between the cruciform lands such that, when two of said twin sheet molded plastic core structures are stacked on top of one another mutually orthogonal rib recesses interact with one another to prevent slippage between the stacked twin sheet molded plastic core structures.

* * * * *